July 28, 1942.   L. TREADWELL ET AL   2,291,358
INSECT BAIT HOLDER
Filed Feb. 6, 1941    2 Sheets-Sheet 1
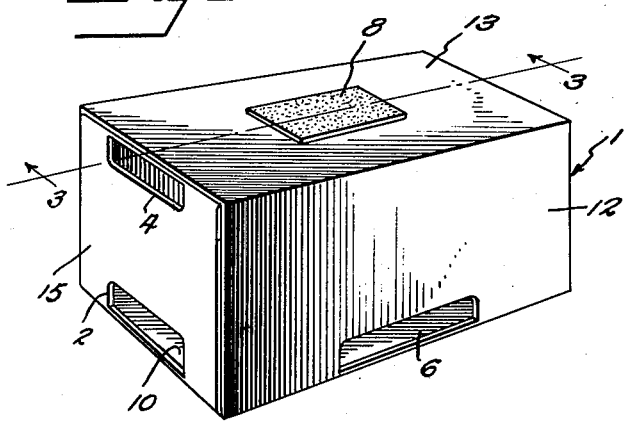
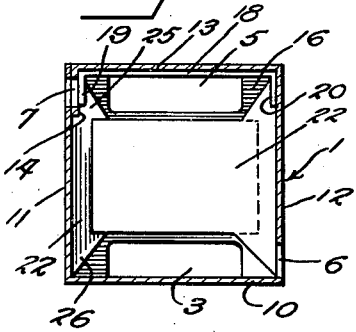
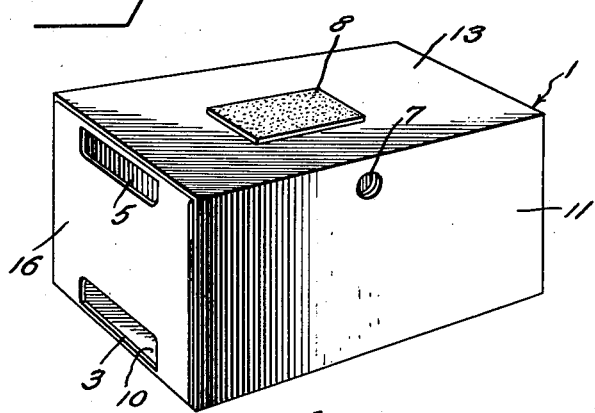
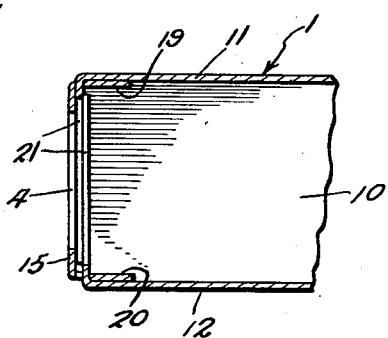
Inventors
Lowndes Treadwell
Maude E. Gaskins
By Mason Fenwick Lawrence
Attorneys

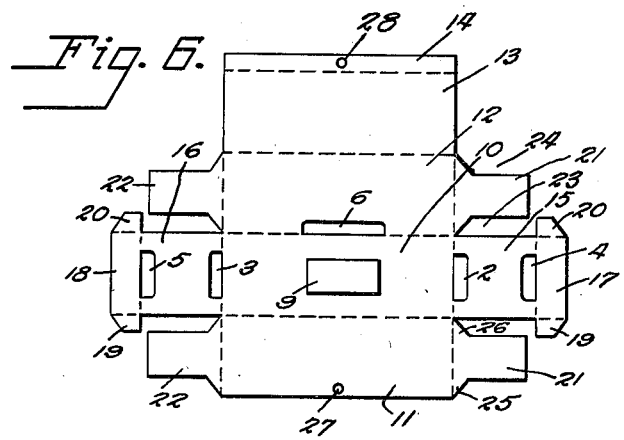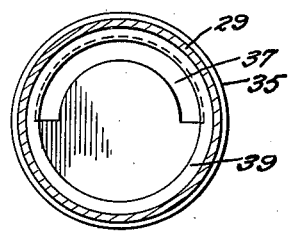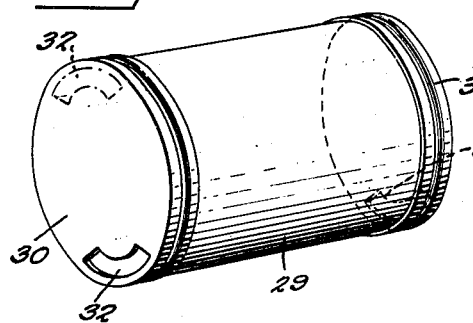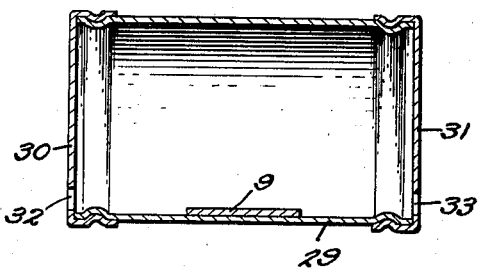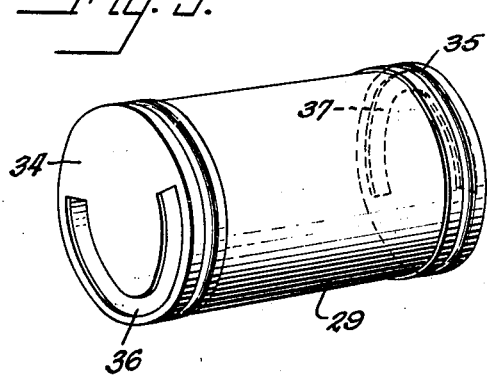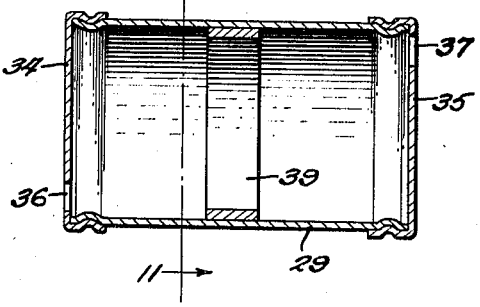

Patented July 28, 1942

2,291,358

UNITED STATES PATENT OFFICE 2,291,358

INSECT BAIT HOLDER

Lowndes Treadwell and Maude E. Gaskins,
Arcadia, Fla.

Application February 6, 1941, Serial No. 377,746

2 Claims. (Cl. 43—131)

This invention relates to insect bait holders for household use, and is an improvement upon the structure disclosed in the patent to Gaskins, No. 1,820,186, granted August 25, 1931.

The invention distinguishes from an insect trap, in that it does not detain the insects, and therefore, does not collect dead insects, with the necessity of being from time to time emptied. On the contrary, it provides merely a focal point made attractive to insects by the nature of the bait, at which point the insects receive the lethal dose and go their way until overcome. Therefore, the bait holder does not fill up with insects, nor does it have to be emptied, and consequently, it can be made to permanently enclose the bait, which is a decided advantage in keeping the bait from access by children or household pets.

One of the objects of the invention is to provide a bait holder in which the bait is permanently so enclosed as to be inaccessible to children.

The bait holder of the aforementioned patent, as well as other known bait holders, have given consideration solely to creeping insects whose habit of life accustoms them to enter and leave crack-like spaces on substantially the same level. There are, however, other classes of insect pests such as flying ants or termites, which take off in flight after eating, and which hesitate to enter a small enclosure unless there is an exit at a higher level, through which they may fly.

One of the objects of the present invention, therefore, is to provide a bait holder having an entrance in the bottom at one end, and an exit at the top at the other end.

Other objects of the invention will appear as the following description of a preferred and practical embodiment thereof proceeds.

In the drawings throughout the several figures of which the same characters of reference have been employed to designate identical parts:

Figure 1 is a perspective view of a bait holder embodying the principles of the present invention showing the front;

Figure 2 is a similar view to Figure 1, showing the back;

Figure 3 is a longitudinal section through the bait holder of Figures 1 and 2;

Figure 4 is a transverse section taken along the line 4—4 of Figure 3;

Figure 5 is a horizontal section in detail, taken along the line 5—5 of Figure 3;

Figure 6 is a plan view of the blank from which the bait holder of Figures 1 and 2 is made;

Figure 7 is a modified form of bait holder;

Figure 8 is a longitudinal section through the bait holder shown in Figure 7;

Figure 9 is a perspective view of still another form of bait holder;

Figure 10 is a longitudinal section through that form of bait holder shown in Figure 9; and Figure 11 is a cross-section taken along the line 11—11 of Figure 10.

Referring now in detail to the several figures, and first adverting to that form of the invention shown in Figures 1 to 6, inclusive, the numeral 1 represents as a whole a rectangular container which is set up from the blank shown in Figure 6. At opposite ends this container is formed adjacent the plane of the bottom with the entrance openings 2 and 3 and, adjacent the plane of the top, with the exit openings 4 and 5. Inasmuch as some types of insects fear one another, provision is made for such to go in separately by the additional entrance opening 6 formed in one side of the container adjacent the plane of the bottom thereof. The blank side of the container may be provided with a hole 7 adapting the container to be hung upon a nail above floor level, if desired, and an alternative securing means may be provided in the form of an adhesive patch 8, adapting the container to be stuck to the underneath surface of a piece of furniture. The bait, which in its preferred form may be a flat strip 9, is adhesively applied to the inner face of the bottom of the container and may be of any desired composition, preferably a bait substance attractive to insects, and containing a poisonous ingredient.

The blank from which this container is made and which is shown in Figure 6, comprises a sheet with lines of fold defining a bottom panel 10, back and front panels 11 and 12, and a top panel 13 terminating in the uniting flap 14. At opposite ends of the bottom panel are the end panels 15 and 16 each having one of the entrance openings, respectively, 2 and 3, and each having one of the exit openings, respectively, 4 and 5. The end panels 15 and 16 terminate in tuck flaps 17 and 18 having lateral locking tabs 19 and 20. The back and front panels have similar end flaps 21 and 22 which fold against the end panels 15 and 16 and are cut away to leave the spaces 23 and 24, which prevent the end flaps from obscuring the entrance and exit openings when the parts are in folded position. The end flaps 21 and 22 flare adjacent their connections to the back and front panels, forming the triangular extensions 25 and 26 behind which the lock tabs 19 and 20 interlock, permanently closing the container. In its preferred form, to facilitate shipping, the blank is only set up to the extent that the flap 14 is united to the back panel 11 with the nail holes 27 and 28 in registry. The front, back, top and bottom panels then form a tubular structure enclosing the bait strip 9, which is stuck to the inner face of the bottom panel 10. The end panels and end flaps extend flatly from said tubular structure. Either the ultimate purchaser may set up the container in its completed form, or it may be done at the factory. It is set up by folding up the end panels 15 and 16 and the end flaps 21 and 22 properly to the parts from which they emanate, folding the tabs 19 and 20 flat against the back of the tuck flaps 17 and 18, inserting the tuck flaps with the thus flat folded tabs beneath the top panel, and letting the locking tabs automatically expand behind the extensions 25 and 26. It will be obvious that those insects whose life activities are confined to a single level, will enter at any one of the entrance openings 2, 3, or 6, eat the bait, and leave by any one of said openings, and that insects which take off in flight after eating will enter by any one of the entrances 2, 3, and 6, and after devouring the bait, will fly upward and leave the bait holder by one of the exit openings 4 or 5, generally the one opposite to the point at which they entered.

It is apparent that due to the interlock of the tabs 19 and 20 with the extensions 25 and 26, the container permanently encloses the bait 9, keeping it inaccessible to children or household pets, the entrance and exit openings being too small and narrow to give access to the bait except by such types of insects as it is designed to attract.

Referring now to that form of the invention shown in Figures 7 and 8, a cylindrical casing 29 is here shown, having the flanged end caps 30 and 31, preferably permanently secured thereto as by crimping. One of said caps, for example, the cap 31, is so tightly secured as to be immovable. The other cap 30 is designedly more loosely secured so that it may be rotated about the casing 29. The caps 30 and 31 are each provided with preferably arcuate slots 32 and 33. In the position of the caps as shown, said slots are both at the lowest point, designed to admit and permit the leaving of creeping insects. The cap 30 may be rotated to such position in which the slot 32 is uppermost, as indicated in broken lines, adapting the bait holder for insects which fly up after eating, such insects entering by the low slot 33, devouring the bait, then flying up and out by way of the high slot 32.

Figure 9 shows still another form of the invention in which the cylindrical casing 29 is provided with the end caps 34 and 35. These caps are both secured preferably irremovably and nonrotatably, each being provided with an arcuate slot, respectively, 36 and 37, each slot preferably having an amplitude of at least 180°, and the slots on the respective caps being arranged on opposite sides of the axial center of the casing. This bait holder may be dropped upon the floor and kicked under a piece of furniture, if desired. When it comes to rest, at least a part of one of the slots will be adjacent the bottom and at least a part adjacent the top. In this form of the invention it is preferred that the bait shall be in the form of a cylindrical strip 39, extending circumferentially about the inner face of the casing 29 in an intermediate zone, this form of bait assuring that the insects must cross it in passing from the inlet slot to the outlet slot.

In any of the forms of the invention as disclosed, the nature of the material of which the bait holder is constructed is immaterial. It may be either of metal, cardboard, or any other desired material.

While we have in the above disclosure described what we believe to be a preferred and practical embodiment of the invention, it will be understood to those skilled in the art that the specific construction of the bait holder, as well as the construction and arrangement of parts is by way of example, and not to be construed as limiting the scope of the invention which is defined in the appended claims.

What we claim as our invention is:

1. An insect bait holder comprising a box folded from a blank having bottom, top, front and back panels united to form a tubular structure and having end flaps and end panels, one of said end panels having an insect entrance slot at the bottom, the other, an insect exit slot at the top, said end panels being provided with inwardly folding connecting flaps at their top edges, tucking beneath said top panel, said tuck flaps having lateral locking tabs foldable against said tuck flaps for insertion of the latter and adapted to spread behind said end flaps adjacent the connections of said end flaps to the back and front panels.

2. An insect bait holder comprising a box folded from a blank having bottom, top, front and back panels united into a tubular structure, and having end flaps and end panels, said end panels being provided with slots giving insects access to the entrance of said enclosure, said end panels being provided with inwardly folding tuck flaps at their top edges tucking beneath said top panel, said tuck flaps having lateral locking tabs foldable flat against said tuck flaps for insertion of the latter and adapted to spread behind said end flaps adjacent the connections of said end flaps to the back and front panels, and a bait piece secured within said enclosure.

LOWNDES TREADWELL.
MAUDE E. GASKINS.